UNITED STATES PATENT OFFICE.

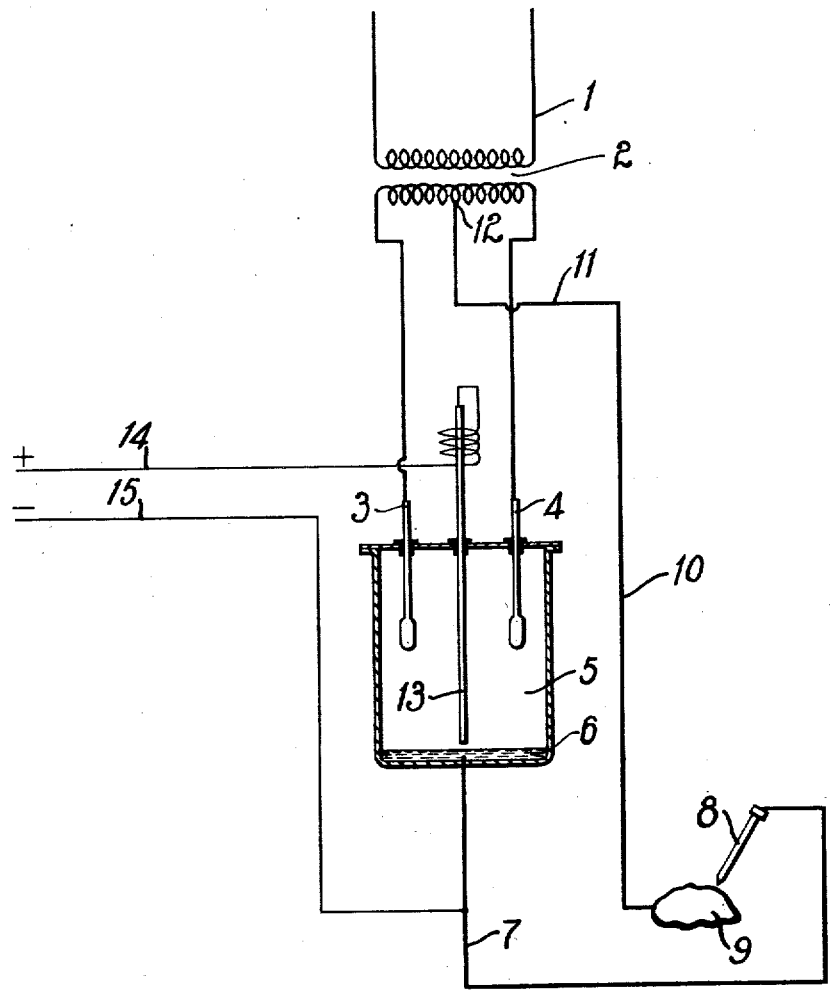

EARL E. EBY, OF WILKINSBURG, PENNSYLVANIA, ASSIGNOR TO WESTINGHOUSE ELECTRIC AND MANUFACTURING COMPANY, A CORPORATION OF PENNSYLVANIA.

WELDING SYSTEM.

1,229,728. Specification of Letters Patent. Patented June 12, 1917.

Application filed October 15, 1914. Serial No. 866,809.

*To all whom it may concern:*

Be it known that I, EARL E. EBY, a citizen of the United States, and a resident of Wilkinsburg, in the county of Allegheny and State of Pennsylvania, have invented a new and useful Improvement in Welding Systems, of which the following is a specification.

My invention relates to welding systems, and it has special reference to systems for electric arc welding which are adapted to operate with alternating current supply, and in which current rectifiers are employed to convert the alternating current into direct current for the welding circuit.

The above object of my invention is to provide a system of the above indicated character which shall be simpler in construction and more economical in operation than the systems which have heretofore been employed, and in which the power losses necessarily incurred in properly regulating the arc shall be reduced to a minimum.

The single figure of the accompanying drawing is a diagrammatic view showing an arc welding system embodying my invention.

For electric arc welding, a direct-current arc is necessary, and, where the available current is alternating, it is now customary to make use of a motor-generator set and to interpose in the direct-current circuit, in series with the arc, a large amount of resistance. This resistance serves to limit the amount of current which flows in the direct-current circuit when the welding pencil is brought into contact with the work and it performs the further function of stabilizing the arc during the welding operation. The amount of resistance necessary for this purpose is so large as to occasion considerable power losses. If, for example, the welding circuit is supplied with direct current at 75 volts, about 40 volts are consumed in the resistance, and, since heavy currents are employed in this service, the resulting power losses are very expensive.

According to my present invention, I substitute, for the motor-generator set usually employed in the service above described, a current rectifier, preferably of the mercury-vapor type, and I interpose, in the circuit which supplies alternating current to the rectifier, a reactance device having sufficiently high reactance to prevent sudden surges of current in the direct-current circuit to which the rectifier supplies current. The reactance device also serves to steady the welding arc in the direct-current circuit, and the use of power-consuming resistance in this circuit is thereby rendered unnecessary.

I prefer to employ a transformer of high reactance as the reactance device in the alternating-current circuit, inasmuch as it is customary to supply alternating current to mercury-vapor rectifiers through transformers. My system therefore involves no departure from ordinary rectifier practice, other than the proper designing of the transformers employed so that their reactance may be sufficiently high. The amount of reactance in the transformer necessary to regulate the direct current in the manner described above will vary with the direct-current load. I have found that a transformer having a reactance of above 30% under given load conditions, is suitable for my purpose, and transformers having much higher reactance than 30% may be employed if the conditions which obtain in the direct-current circuit require it.

Referring now to the accompanying drawing, a suitable source of alternating current is indicated at 1, supplying current to a transformer 2, the terminals of which are connected to the main electrodes 3 and 4 of a mercury-vapor rectifier 5, the mercury cathode of which is indicated at 6. The direct current delivered by the rectifier 5 is transmitted, through a conductor 7, to a welding electrode or pencil 8, which is associated with a metallic object 9. This object represents the work to be welded, and is connected, by means of conductors 10 and 11, to the neutral point 12 of the transformer 2. The rectifier 5 is provided with an auxiliary keeping-alive electrode 13, which may be energized, as shown in the drawing, by direct current taken from an auxiliary source of supply, the terminals of which are indicated at 14 and 15.

It will be evident from the foregoing description, and from the drawing, that alternating current will be delivered, at a proper voltage, from the transformer 2 to the rectifier 5, and that the direct current delivered by the rectifier will pass through the electrode 8 and the work 9, and will be returned to the neutral point of the transformer 2.

Since the reactance of the transformer 2 is high, surges of current will not be permitted to flow through the direct-current circuit when the electrode 8 is brought into contact with the work 9, and, when the arc is drawn between the electrodes, the reactance of the transformer will maintain the arc in a stable condition, as set forth above. It will also be evident that the power losses in my system are very much less than where high resistance is used in the direct-current circuit.

The rectifier 5, as shown in the drawing, is of the type which has two main electrodes, but it is obvious that the rectifier may be provided with more than two electrodes, as is usual when polyphase alternating current is rectified, or that the electrodes 3 and 4 may be inclosed in separate rectifier units, each of which is provided with its own keeping-alive electrode. Other modifications in the system which I have shown and described may readily be devised by persons skilled in the art to which my invention appertains, and it is therefore to be understood that my invention comprehends all such modifications, and is limited only by the scope of the appended claims.

I claim as my invention:

1. A welding system comprising welding electrodes, an alternating-current circuit, means for converting the alternating current in the said circuit into direct current and supplying such direct current to the said electrodes, and a reactance device in the said alternating-current circuit for stabilizing the direct current at the said electrodes.

2. A welding system comprising welding electrodes, an alternating-current circuit, means for converting the alternating current in the said circuit into direct current and for supplying such direct current to the said electrodes, and a transformer of high reactance in the said alternating-current circuit.

3. A welding system comprising an alternating-current circuit, means for converting the alternating current in the said circuit into direct current, and a transformer in the said alternating-current circuit having sufficient reactance to stabilize the said direct current.

4. A welding system comprising welding electrodes, an alternating-current circuit, a rectifier for converting the alternating current in the said circuit into direct current, and means for supplying the resulting direct current to the said electrodes.

5. A welding system adapted to be operated by means of alternating current and comprising a vapor rectifier.

6. A welding system comprising an alternating-current circuit, a rectifier, and a reactance device in the said alternating-current circuit adapted to stabilize the direct current delivered by the said rectifier.

7. A welding system comprising an alternating-current circuit, a rectifier, and a transformer of high reactance in the said alternating-current circuit.

8. A welding system comprising an alternating-current circuit, a rectifier, and a transformer having a reactance of at least 30% in the said alternating-current circuit.

9. A welding system comprising an alternating-current circuit, a rectifier, and a transformer having a reactance of substantially 30% in the said alternating-current circuit.

10. The combination of an alternating current electric circuit, a rectifier for converting the alternating current in the said circuit into direct current, a load receiving direct current from the said rectifier and adapted to be eliminated from the direct current circuit during the normal operation of the system and a reactance device in the said alternating current circuit having sufficient reactance to prevent disastrous current surges when the said load is eliminated from the circuit.

In testimony whereof, I have hereunto subscribed my name this 29th day of Sept., 1914.

EARL E. EBY.

Witnesses:
C. KIRWER,
B. B. HINES.